(12) United States Patent
Yokoyama

(10) Patent No.: US 9,831,530 B2
(45) Date of Patent: Nov. 28, 2017

(54) ELECTRODE ASSEMBLY AND BATTERY

(71) Applicant: SEIKO EPSON CORPORATION, Tokyo (JP)

(72) Inventor: Tomofumi Yokoyama, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 11 days.

(21) Appl. No.: 15/168,501

(22) Filed: May 31, 2016

(65) Prior Publication Data

US 2016/0365607 A1    Dec. 15, 2016

(30) Foreign Application Priority Data

Jun. 9, 2015  (JP) ................. 2015-116403

(51) Int. Cl.
*H01M 10/05* (2010.01)
*H01M 10/0585* (2010.01)
(Continued)

(52) U.S. Cl.
CPC ........ *H01M 10/0585* (2013.01); *C01G 45/12* (2013.01); *C01G 51/70* (2013.01); *C01G 53/70* (2013.01); *H01M 4/043* (2013.01); *H01M 4/0416* (2013.01); *H01M 4/0471* (2013.01); *H01M 4/131* (2013.01);
(Continued)

(58) Field of Classification Search
CPC ........ C01G 45/12; C01G 53/70; C01G 51/70; H01M 2300/0068; H01M 4/0416; H01M 4/043; H01M 4/0471; H01M 4/131; H01M 4/1391; H01M 4/366; H01M 4/485;
(Continued)

(56) References Cited

U.S. PATENT DOCUMENTS

2004/0096745 A1  5/2004 Shibano et al.
2009/0229700 A1  9/2009 Kanamura et al.
(Continued)

FOREIGN PATENT DOCUMENTS

EP       2816639 A2   12/2014
JP    2004-179158 A    6/2004
(Continued)

OTHER PUBLICATIONS

Jul. 25, 2016 Extended Search Report issued in European Patent Application No. 16173301.9.

*Primary Examiner* — Mark F Huff
*Assistant Examiner* — Monique Wills
(74) *Attorney, Agent, or Firm* — Oliff PLC

(57) ABSTRACT

An electrode assembly includes a composite body which includes an active material layer containing an active material constituted by a transition metal oxide, a solid electrolyte layer (solid electrolyte portion) containing a solid electrolyte, and a multiple oxide molded body (multiple oxide portion) containing at least one of a metal multiple oxide represented by the following general formula (1): $Ln_2Li_{0.5}M_{0.5}O_4$ (wherein Ln represents a lanthanoid, and M represents a transition metal) and a derivative thereof, and a current collector which is provided on one face (one of the faces) of the composite body by being bonded to the active material layer, wherein in the composite body, the multiple oxide molded body, the active material layer, and the solid electrolyte layer are formed in contact with each other in this order from the side of the one face of the composite body.

14 Claims, 6 Drawing Sheets

(51) Int. Cl.
    *C01G 45/12*     (2006.01)
    *C01G 51/00*     (2006.01)
    *C01G 53/00*     (2006.01)
    *H01M 4/04*     (2006.01)
    *H01M 4/131*     (2010.01)
    *H01M 4/1391*     (2010.01)
    *H01M 4/36*     (2006.01)
    *H01M 4/485*     (2010.01)
    *H01M 4/505*     (2010.01)
    *H01M 4/525*     (2010.01)
    *H01M 10/0525*     (2010.01)
    *H01M 10/0562*     (2010.01)

(52) U.S. Cl.
    CPC ......... *H01M 4/1391* (2013.01); *H01M 4/366* (2013.01); *H01M 4/485* (2013.01); *H01M 4/505* (2013.01); *H01M 4/525* (2013.01); *H01M 10/0525* (2013.01); *H01M 10/0562* (2013.01); *C01P 2004/84* (2013.01); *C01P 2006/40* (2013.01); *H01M 2220/30* (2013.01); *H01M 2300/0068* (2013.01)

(58) Field of Classification Search
    CPC .. H01M 4/505; H01M 4/525; H01M 10/0525; H01M 10/0562; H01M 10/0585; H01M 2220/30
    See application file for complete search history.

(56) References Cited

U.S. PATENT DOCUMENTS

| | | |
|---|---|---|
| 2012/0115039 A1 | 5/2012 | Ouchi et al. |
| 2014/0087264 A1 | 3/2014 | Li et al. |
| 2014/0205898 A1 | 7/2014 | Lee et al. |
| 2014/0322613 A1 | 10/2014 | Kitagawa et al. |

FOREIGN PATENT DOCUMENTS

| | | |
|---|---|---|
| JP | 2006-277997 A | 10/2006 |
| JP | 2009-215130 A | 9/2009 |
| JP | 4615339 B2 | 1/2011 |
| WO | 2011/132627 A1 | 10/2011 |

ELECTRODE ASSEMBLY AND BATTERY

This application claims a priority to Japanese Patent Application No. 2015-116403 filed on Jun. 9, 2015 which is hereby expressly incorporated by reference in its entirety.

BACKGROUND

1. Technical Field

Several aspects of the present invention relate to an electrode assembly and a battery.

2. Related Art

As a power supply for many electrical devices such as portable information devices, a lithium battery (including a primary battery and a secondary battery) has been used. The lithium battery includes a positive electrode, a negative electrode, and an electrolyte layer which is placed between the layers of these electrodes and mediates the conduction of a lithium ion.

Recently, as a lithium battery having both of a high energy density and safety, an all-solid-state lithium battery using a solid electrolyte as a forming material of an electrolyte layer has been proposed (see, for example, JP-A-2006-277997, JP-A-2004-179158, and Japanese Patent No. 4615339).

As such an all-solid-state lithium battery, those having a high output power and a high capacity stably over a long period of time have been demanded, however, it cannot be said that an all-solid-state lithium battery in the related art has sufficient such characteristics.

SUMMARY

An advantage of some aspects of the invention is to solve such a problem.

An electrode assembly according to an aspect of the invention includes a composite body which includes an active material portion, a solid electrolyte portion, and a multiple oxide portion, and a current collector which is bonded to the composite body, wherein the active material portion contains an active material constituted by a transition metal oxide, the solid electrolyte portion contains a solid electrolyte having ion conductivity, the multiple oxide portion contains at least one of a metal multiple oxide represented by the following formula (1) and a derivative thereof, and in the composite body, the active material portion is formed between and in contact with the multiple oxide portion and the solid electrolyte portion.

$$Ln_2Li_{0.5}M_{0.5}O_4 \qquad (1)$$

In the formula (1), Ln represents a lanthanoid, and M represents a transition metal.

By applying the electrode assembly having such a configuration to a battery, the battery stably maintains a high output power and a high capacity over a long period of time.

In the electrode assembly according to the aspect of the invention, it is preferred that the active material portion is formed in the form of a layer so as to cover the multiple oxide portion.

By applying the electrode assembly having such a configuration to a battery, the battery stably maintains a high output power and a high capacity over a long period of time.

In the electrode assembly according to the aspect of the invention, it is preferred that the multiple oxide portion includes a plurality of communication holes therein, and the active material portion covers the surfaces of the plurality of communication holes.

By applying the electrode assembly having such a configuration to a battery, the battery stably maintains a high output power and a high capacity over a long period of time.

In the electrode assembly according to the aspect of the invention, it is preferred that the surface of a face of the composite body to which another electrode for constituting a battery is bonded is the solid electrolyte portion.

By applying the electrode assembly having such a configuration to a battery, the active material portion and the multiple oxide portion are not in contact with the another electrode, and therefore, the safety can be increased.

In the electrode assembly according to the aspect of the invention, it is preferred that the electron conductivity of the multiple oxide portion is higher than the electron conductivity of the active material portion.

By applying the electrode assembly having such a configuration to a battery, the battery stably maintains a high output power and a high capacity over a long period of time.

In the electrode assembly according to the aspect of the invention, it is preferred that the transition metal oxide contains lithium and at least one element selected from cobalt, manganese, and nickel.

According to this configuration, the active material portion can be made to have both characteristics of high electron conductivity and small volume change during charging and discharging. As a result, the capacity and life of a lithium secondary battery are increased.

In the electrode assembly according to the aspect of the invention, it is preferred that the solid electrolyte has a garnet-type crystal structure or a quasi-garnet-type crystal structure.

The solid electrolyte having a garnet-type crystal structure or a quasi-garnet-type crystal structure has high ion conductivity and is electrochemically stable, and therefore is preferably used as a solid electrolyte.

A battery according to an aspect of the invention includes the electrode assembly according to the aspect of the invention, and an electrode provided on a face of the composite body to which another electrode is bonded.

By including the electrode assembly having such a configuration, the battery stably maintains a high output power and a high capacity over a long period of time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
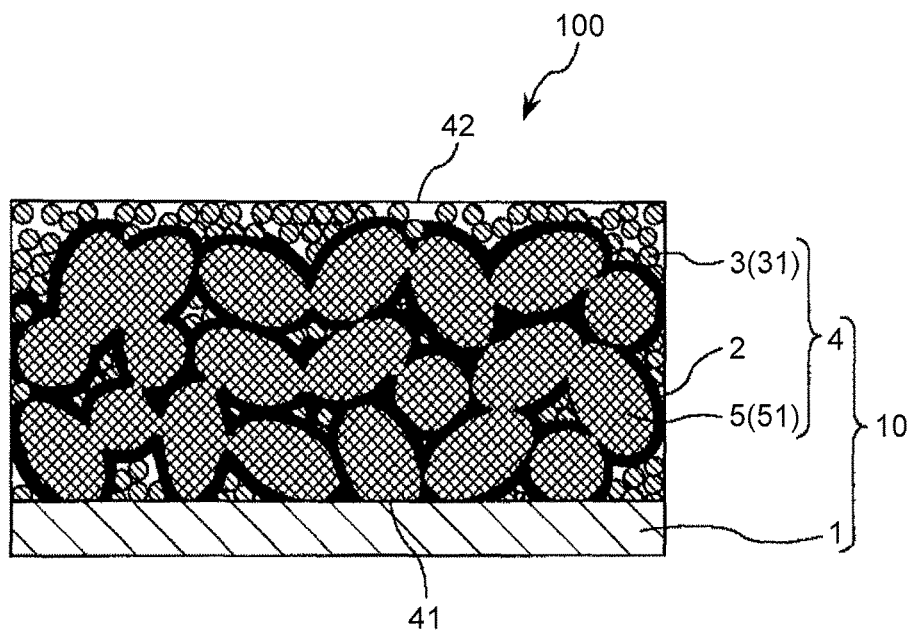
FIG. 1 is a longitudinal cross-sectional view of an electrode assembly according to a first embodiment.

Hereinafter, embodiments and examples according to the invention will be described with reference to the accompanying drawings. The drawings to be used for the description are for reference and illustration only, and the dimension, ratio, etc. of each constituent component shown in the drawings are sometimes different from those of the actual one. Further, in the description of the drawings, the upper side in the drawing shown is referred to as "upper" and the lower side therein is referred to as "lower".

First Embodiment

In this embodiment, one embodiment of an electrode assembly and a lithium secondary battery using the electrode assembly is described.

FIG. 1 shows an electrode assembly 10. The electrode assembly 10 includes a current collector 1, an active material layer 2, a multiple oxide molded body 5, and a solid electrolyte layer 3.

Figure 2:
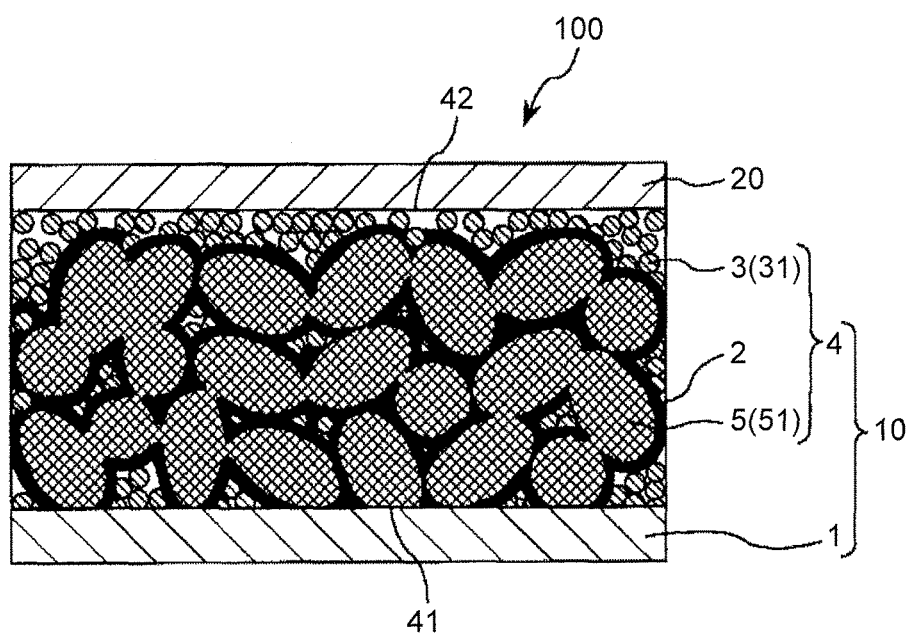
FIG. 2 is a longitudinal cross-sectional view of a lithium secondary battery using the electrode assembly according to the first embodiment.

FIG. 2 shows a lithium secondary battery 100 using the electrode assembly 10. The lithium secondary battery 100 includes the electrode assembly 10 and an electrode 20 as constituent components. This lithium secondary battery 100 is a so-called all-solid-state lithium (ion) secondary battery.

First, the electrode assembly 10 will be described with reference to FIG. 1.

Here, a combination of the active material layer 2, the solid electrolyte layer 3, and the multiple oxide molded body 5 is referred to as "composite body 4". The electrode assembly 10 is constituted by the current collector 1 and the composite body 4. The active material layer 2 is provided so as to cover the multiple oxide molded body 5, and the multiple oxide molded body 5 is in contact with the solid electrolyte layer 3 through the active material layer 2.

The current collector 1 is provided in contact with one face 41 (one of the faces) of the composite body 4.

The current collector 1 functions as a positive electrode when the active material layer 2 is constituted by a positive electrode active material, and functions as a negative electrode when the active material layer 2 is constituted by a negative electrode active material.

As a forming material (constituent material) of the current collector 1, for example, one type of metal (a metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy containing two or more types of metal elements selected from this group, or the like can be used.

The shape of the current collector 1 is not particularly limited, and examples thereof include a plate-like shape, a foil-like shape, and a net-like shape. The surface of the current collector 1 may be smooth or may have irregularities formed thereon.

The active material layer 2 is in the form of a layer and covers the surface of a multiple oxide particle 51 in a gap (communication hole) of the below-mentioned multiple oxide molded body 5. In this embodiment, in the gap (communication hole) of the multiple oxide molded body 5, an exposed region of the surface of the multiple oxide particle 51 is selectively covered with the active material layer 2, and a region where the multiple oxide particles 51 are in contact with each other is not covered with the active material layer 2.

This active material layer 2 contains as a forming material (constituent material), an inorganic electrode active material (active material) containing a lithium multiple oxide as a transition metal oxide, and by appropriately selecting the type of this forming material, the current collector 1 can be a positive electrode or a negative electrode.

The "lithium multiple oxide" as used herein refers to an oxide which always contains lithium, and also contains two or more types of metal ions as a whole, but is free of oxoacid ions.

Examples of the lithium multiple oxide in the case where the current collector 1 is used as the positive electrode include $LiCoO_2$, $LiNiO_2$, $LiMn_2O_4$, $LiNi_{1/3}Co_{1/3}Mn_{1/3}O_2$, $Li_2Mn_2O_3$, $LiNi_{0.8}Co_{0.16}Al_{0.04}O_2$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$. Among these, the lithium multiple oxide preferably contains, as a main material, a compound containing lithium and at least one element selected from cobalt, manganese, and nickel, specifically, the lithium multiple oxide preferably contains, as a main component, a compound selected from the group consisting of lithium cobalt oxide, lithium nickel manganese cobalt oxide, lithium nickel oxide, and lithium nickel cobalt aluminum oxide. By including such a lithium multiple oxide, the active material layer 2 transfers electrons in the layer, and transfers a lithium ion between the active material layer 2 and the solid electrolyte layer 3, and thus exhibits a function as an active material. According to this, the active material layer 2 can have both characteristics of high electron conductivity and small volume change during charging and discharging. As a result, the capacity and life of the lithium secondary battery 100 are increased.

Further, solid solutions obtained by substituting part of the atoms in a crystal of any of these lithium multiple oxides with another transition metal, a typical metal, an alkali metal, an alkaline earth metal, a lanthanoid, a chalcogenide, a halogen, or the like are also included in the lithium multiple oxide, and any of these solid solutions can also be used as the positive electrode active material.

Further, as a forming material of the active material layer 2 in the case where the current collector 1 is used as the negative electrode, for example, a lithium multiple oxide such as $Li_4Ti_5O_{12}$ or $Li_2Ti_3O_7$, or a material which can occlude lithium such as Si, SiO, or Sn can be used as the negative electrode active material.

The average film thickness of the active material layer 2 is, although it varies depending on the surface area thereof in the multiple oxide molded body 5, for example, preferably 300 nm or more and 10 μm or less, more preferably 500 nm or more and 5 μm or less. When the active material layer 2 has an average film thickness in such a range, a sufficient volume as the active material layer 2 contributing to the battery reaction can be ensured. As a result, the capacity of a lithium secondary battery using the electrode assembly 10 is easily increased.

The solid electrolyte layer 3 is configured to include a forming material having lithium ion conductivity. The solid electrolyte layer 3 and the active material layer 2 are in contact with each other, and the solid electrolyte layer 3 is also present in gaps formed in the multiple oxide molded body 5. In the composite body 4, the solid electrolyte layer 3 is provided such that the solid electrolyte layer 3 is exposed alone and the active material layer 2 and the multiple oxide molded body 5 are not exposed on the side of the other face 42 which comes in contact with the electrode 20. According to this, a short circuit between the current collector 1 and the electrode 20 can be prevented.

The forming material of the solid electrolyte is not particularly limited, and examples thereof include oxides, sulfides, halides, nitrides, and hydroxides such as $Li_{6.75}La_3Zr_{1.75}Nb_{0.25}O_{12}$, $SiO_2$—$SiO_2$—$P_2O_5$—$Li_2O$, $SiO_2$—$P_2O_5$—$LiCl$, $Li_2O$—$LiCl$—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}$, $LiNbO_3$, $Li_{0.35}La_{0.55}TiO_3$, $Li_2S$—$SiS_2$, $Li_2S$—$SiS_2$—$LiI$, $Li_2S$—$SiS_2$—$P_2S_5$, $Li_3N$, $LiI$, $LiI$—$CaI_2$, $LiI$—$CaO$, $LiAlCl_4$, $LiAlF_4$, $LiI$—$Al_2O_3$, $LiF$—$Al_2O_3$, $LiBr$—$Al_2O_3$, $Li_2O$—$TiO_2$, $La_2O_3$—$Li_2O$—$TiO_2$, $Li_3NI_2$, $Li_3N$—$LiI$—$LiOH$, $Li_3N$—$LiCl$, $Li_6NBr_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_4SiO_4$—$Li_4ZrO_4$, $Li_{2+x}C_{1-x}BxO_3$, $LiBH_4$, $Li_{7-x}PS_{6-x}Cl_x$, and $Li_{10}GeP_2S_{12}$, and among these, one type or two or more types in combination can be used. Further, any of a crystalline material, an amorphous material, and a partially crystallized glass of a partially substituted compound thereof can also be used. In addition, a complex in which fine particles of an insulating material such as $Al_2O_3$, $SiO_2$, or $ZrO_2$ are embedded in any of these solid electrolytes so that the insulating material is combined with the solid electrolyte can also be used as the forming material of the solid electrolyte.

Further, as the solid electrolyte, a solid electrolyte having a garnet-type crystal structure or a quasi-garnet-type crystal structure is preferred. The solid electrolyte having a garnet-type crystal structure or a quasi-garnet-type crystal structure has high ion conductivity and is electrochemically stable, and therefore is preferably used as the solid electrolyte.

In addition, the garnet-type crystal structure or the quasi-garnet-type crystal structure has a characteristic that transfer of a lithium ion can be smoothly performed between the solid electrolyte and a substance having a tetragonal crystal structure as the crystal structure.

Specific examples of a compound which can be easily made to have a garnet-type crystal structure or a quasi-garnet-type crystal structure include compounds represented by the general formula: $Li_xM^1M^2O_{12}$. According to this, the solid electrolyte can be easily made to have a garnet-type crystal structure or a quasi-garnet-type crystal structure.

As $M^1$, an arbitrary element which can form a garnet crystal is selected, however, above all, in order to form a crystal having high ion conductivity, in particular, it is preferred to use at least one element selected from Zr, Nb, Hf, Ta, Sn, W, Sb, and Bi. Further, as $M^2$, an arbitrary element which can form a garnet crystal along with $M^1$ is selected, however, above all, in order to form a crystal having high ion conductivity, in particular, a lanthanoid element is preferred, and La is more preferably selected.

Further, solid solutions obtained by substituting part of the atoms of any of these compositions with another transition metal, a typical metal, an alkali metal, an alkaline earth metal, a lanthanoid, a chalcogenide, a halogen, or the like can also be used as the solid electrolyte.

The ion conductivity of the solid electrolyte layer 3 is preferably $1 \times 10^{-5}$ S/cm or more. When the solid electrolyte layer 3 has such an ion conductivity, an ion contained in the solid electrolyte layer 3 at a position away from the surface of the active material layer 2 also reaches the surface of the active material layer 2 and can contribute to the battery reaction in the active material layer 2. Due to this, the utilization of the active material in the active material layer 2 is improved, and thus, the capacity can be increased.

The "ion conductivity of the solid electrolyte layer 3" as used herein refers to the "total ion conductivity", which is the sum of the "bulk conductivity", which is the conductivity of the above-mentioned solid electrolyte itself constituting the solid electrolyte layer 3, and the "grain boundary ion conductivity", which is the conductivity between crystal grains when the solid electrolyte is a crystalline material.

The ion conductivity of the solid electrolyte layer 3 is determined, for example, as follows. A press-molded body obtained by press-molding a solid electrolyte powder in a tablet die at 624 MPa is sintered at 700° C. for 8 hours in an air atmosphere, and then, a platinum electrode having a diameter of 0.5 cm and a thickness of 100 nm is formed on both surfaces of the press-molded body by sputtering, and then, the measurement is performed by an AC impedance method. As the measurement device, for example, an impedance analyzer (model SI1260, manufactured by Solartron Co., Ltd.) is used.

Next, the multiple oxide molded body 5 will be described.

The multiple oxide molded body 5 is a molded body formed by three-dimensionally connecting a plurality of porous multiple oxide particles 51 to one another and has a plurality of pores formed by connecting the plurality of multiple oxide particles 51 to one another. The plurality of pores form communication holes which communicate with one another like a net in the inside of the multiple oxide molded body 5. That is, the multiple oxide molded body 5 is a porous body including gaps composed of communication holes.

The multiple oxide particle 51 is in the form of a particle and contains at least one of a metal multiple oxide represented by the following general formula (1) and a derivative thereof.

This compound has excellent electron conductivity.

$$Ln_2Li_{0.5}M_{0.5}O_4 \qquad (1)$$

In the formula (1), Ln represents a lanthanoid, and M represents a transition metal.

When the multiple oxide particle 51 is constituted by a compound which contains at least one of the metal multiple oxide represented by the above general formula (1) and a derivative thereof as described above, the multiple oxide particle 51 performs the transfer of electrons between the plurality of multiple oxide particles 51 and exhibits a function as the multiple oxide molded body 5.

The average particle diameter of the multiple oxide particles 51 is preferably 300 nm or more and 5 μm or less, more preferably 450 nm or more and 3 μm or less, further more preferably 500 nm or more and 1 μm or less.

In order to obtain higher performance as the lithium secondary battery 100, it is necessary that more solid electrolyte layer 3 should be present in the gaps of the multiple oxide molded body 5. When the average particle diameter of the multiple oxide particles 51 is less than the above lower limit, the radius of the pore constituting the gap tends to be small such that the radius of the pore is several tens of nanometers, and therefore, it is sometimes difficult to allow the materials for forming the active material layer 2 and the solid electrolyte layer 3 to penetrate into the pore. As a result, it becomes difficult to fill the inside of the pore with the active material layer 2 and the solid electrolyte layer 3, and thus, it becomes difficult to form a lithium secondary battery having a high capacity.

When the average particle diameter of the multiple oxide particles 51 exceeds the above upper limit, although the radius of the pore constituting the gap is further increased, the specific surface area which is the surface area per unit mass of the multiple oxide molded body 5 to be formed is further decreased, and therefore, the contact area between the multiple oxide molded body 5 and the solid electrolyte layer 3 through the active material layer 2 is further decreased, and thus, the capacity as a lithium secondary battery is further decreased.

The porosity of the multiple oxide molded body 5 composed of a porous body formed by three-dimensionally connecting a plurality of multiple oxide particles 51 to one another is preferably 10% or more and 50% or less, more preferably 30% or more and 50% or less. When the multiple oxide particles 51 have an average particle diameter within the above range, the porosity of the multiple oxide molded body 5 can be set as described above. According to this, the capacity of a lithium secondary battery using the electrode assembly 10 can be increased.

The average particle diameter of the multiple oxide particles 51 can be determined by dispersing the multiple oxide particles 51 in n-octanol at a concentration in the range of 0.1 mass % or more and 10 mass % or less, and then, measuring the median diameter using a light scattering particle size distribution analyzer (Nanotrac UPA-EX250, manufactured by Nikkiso Co., Ltd.).

The porosity can be determined, for example, according to the following formula (I) from (1) the volume (apparent volume) of the multiple oxide molded body 5 including the pores obtained from the external dimension of the multiple oxide molded body 5, (2) the mass of the multiple oxide molded body 5, and (3) the density of the active material constituting the multiple oxide molded body 5.

Porosity (%)=[1−(mass of multiple oxide molded body)/(apparent volume)×(density of active material)]×100     (I)

Since the active material layer 2 covers the multiple oxide molded body 5, the lithium ion conductivity and electron conductivity of the multiple oxide molded body 5 contributes to the increase in the capacity and output power of the lithium secondary battery.

In the composite body 4, the multiple oxide molded body 5 functions as a path to conduct electrons in the thickness direction of the composite body 4 and can smoothly supply electrons to the current collector 1. As a result, the internal resistance of the composite body 4 is decreased. In addition, since the multiple oxide molded body 5 can be made to exhibit the function as a path to conduct electrons in this manner, the selection range of the type of the electrode active material to be used for the active material layer 2 is expanded. Further, the multiple oxide molded body 5 is exposed from the composite body 4 on the face 41 and comes in contact with the current collector 1, and therefore, electrons can be more smoothly conducted to the current collector 1.

By including the multiple oxide molded body 5 in the lithium secondary battery, the electron conductivity is further increased as compared with the case where only the active material layer 2 is included, and the decrease in the coulombic efficiency due to potential drop is reduced. Therefore, the output power and capacity density of the lithium secondary battery 100 can be improved. As a result, the lithium secondary battery 100 which stably maintains a high output power and a high capacity over a long period of time is formed.

Further, the multiple oxide molded body 5 contains at least one of the metal multiple oxide represented by the above general formula (1) and a derivative thereof as described above. However, when a derivative which forms a tetragonal crystal is contained, also the multiple oxide molded body 5 containing such a derivative has excellent electron conductivity in the same manner as the multiple oxide molded body 5 containing the metal multiple oxide represented by the above general formula (1). That is, by forming the multiple oxide molded body 5 containing a derivative which forms a tetragonal crystal in contact with the active material layer 2, the above-mentioned effect can be obtained.

Further, M contained in the metal multiple oxide represented by the above general formula (1) and a derivative thereof is preferably the same transition metal as that contained in the active material layer 2. According to this, the multiple oxide molded body 5 containing at least one of the metal multiple oxide represented by the above general formula (1) and a derivative thereof can be made to have excellent adhesiveness to the active material layer 2. As a result, also such a viewpoint, the transfer of electrons between the multiple oxide molded body 5 and the active material layer 2 can be more smoothly performed.

Further, Ln in the above general formula (1) represents a lanthanoid, but is preferably at least one element selected from La, Pr, and Nd among the lanthanoids.

In addition, M in the above general formula (1) represents a transition metal, but is preferably at least one element selected from Co, Ni, Mn, Fe, and Cu among the transition metals.

By selecting such elements as the lanthanoid and the transition metal, the multiple oxide molded body 5 can be made to have more excellent electron conductivity.

Examples of the derivative of the metal multiple oxide which is represented by the above general formula (1) and forms a tetragonal crystal include $La_2Li_{0.5}Co_{0.5}O_4$, $La_2Li_{0.5}Ni_{0.5}O_4$, $La_2Li_{0.5}Cu_{0.5}O_4$, $La_{1.5}Sr_{0.5}Li_{0.5}Co_{0.5}O_4$, and $Nd_2Li_{0.5}Ni_{0.5}O_4$.

When the electron conductivity of the multiple oxide molded body 5 is higher than the electron conductivity of the active material layer 2, by including the multiple oxide molded body 5, the internal resistance of the composite body 4 can be reliably decreased.

In order to achieve this, the electron conductivity of the multiple oxide molded body 5 is preferably $1.2 \times 10^{-5}$ S/cm or more.

On the face 41 of the composite body 4, the active material layer 2 and the multiple oxide molded body 5 are exposed from the solid electrolyte layer 3. In order to expose the active material layer 2 and the multiple oxide molded body 5, a polishing step may be performed for the face 41 in some cases. When a polishing process is performed, on the face 41, a scratch mark (polishing mark), which is a mark of the polishing process is left.

The electrode assembly 10 of this embodiment can be molded without using an organic material such as a binder for binding the multiple oxide particles to each other when molding the multiple oxide molded body 5, and is constituted by almost only an inorganic material in such a case. Specifically, in the electrode assembly 10 of this embodiment, a mass loss percentage when the composite body 4 (the active material layer 2, the solid electrolyte layer 3, and the multiple oxide molded body 5) is heated to 400° C. for 30 minutes is 5 mass % or less. The mass loss percentage is preferably 3 mass % or less, more preferably 1 mass % or less, and particularly preferably, the mass loss is not observed or is within the limits of error. Since the composite body 4 shows such a mass loss percentage, in the composite body 4, a material which is evaporated under a predetermined heating condition such as a solvent or adsorbed water, or an organic material which is vaporized by burning or oxidation under a predetermined heating condition is contained in an amount of only 5 mass or less with respect to the total mass of the structure.

The mass loss percentage of the composite body 4 can be determined as follows. By using a thermogravimetric/differential thermal analyzer (TG-DTA), the composite body 4 is heated under a predetermined heating condition, and the mass of the composite body 4 after heating under the predetermined heating condition is measured, and the mass loss percentage is calculated from the ratio between the mass before heating and the mass after heating.

Further, in the electrode assembly 10 of this embodiment, the composite body 4 is configured as described above, and therefore, the addition amount of a binder or the like contained in the composite body 4 is reduced, and thus, as compared with the case where a binder or the like is used, the capacity density per unit volume of the electrode assembly 10 is improved.

In view of these, the electrode assembly 10 produced by the below-mentioned production method of this embodiment and having the above-mentioned configuration can improve the capacity of a lithium secondary battery using the electrode assembly 10 and also can increase the output power thereof.

Further, in the composite body 4, on the face 41, the active material layer 2, the solid electrolyte layer 3, and the multiple oxide molded body 5 are exposed, and on the other face 42, the solid electrolyte layer 3 is exposed alone. In such a state, the current collector 1 is bonded to the face 41, and the electrode 20 is bonded to the other face 42. According to such a configuration, in the lithium secondary battery 100, the electrode 20 and the current collector 1 can be prevented from being connected to each other through the active material layer 2 and the multiple oxide molded body 5, that is, a short circuit therebetween can be prevented. In other words, the solid electrolyte layer 3 also exhibits a function as a short circuit prevention layer for preventing the occurrence of a short circuit in the lithium secondary battery 100.

The electrode 20 is provided in contact with the solid electrolyte layer 3 without coming in contact with the active material layer 2 and the multiple oxide molded body 5 on the other face 42 on the opposite side to the current collector 1 of the composite body 4.

The electrode 20 functions as a negative electrode when the active material layer 2 is constituted by a positive electrode active material, and also functions as a positive electrode when the active material layer 2 is constituted by a negative electrode active material.

As a forming material (constituent material) of the electrode 20, in the case where the electrode 20 is a negative electrode, for example, lithium (Li) can be used, and in the case where the electrode 20 is a positive electrode, for example, aluminum (Al) can be used.

The thickness of the electrode 20 is not particularly limited, but is, for example, preferably 1 μm or more and 100 μm or less, more preferably 20 μm or more and 50 μm or less.

Further, in the case where the electrode 20 is a negative electrode, a negative electrode layer containing a negative electrode active material as a main material may be interposed between the solid electrolyte layer 3 and the electrode 20.

Examples of the negative electrode active material include $Nb_2O_5$, $V_2O_5$, $TiO_2$, $In_2O_3$, ZnO, $SnO_2$, NiO, ITO (Sn-doped indium oxide), AZO (aluminum-doped zinc oxide), GZO (gallium-doped zinc oxide), ATO (antimony-doped tin oxide), FTO (fluorine-doped tin oxide), anatase-type $TiO_2$, lithium multiple oxides such as $Li_4Ti_5O_{12}$ and $Li_2Ti_3O_7$, metals and alloys such as Si, Sn, Si—Mn, Si—Co, and Si—Ni, a carbon material, and a material obtained by intercalating lithium ions into layers of a carbon material.

Next, a method for producing the electrode assembly 10 and the lithium secondary battery 100 will be described.

First, a method for producing the electrode assembly 10 will be described with reference to FIGS. 3A to 6.

First, a multiple oxide molded body 5 composed of a porous body is obtained by three-dimensionally connecting a plurality of multiple oxide particles 51 in the form of particles to one another by heating the multiple oxide particles 51 (first step).

Figure 3A:
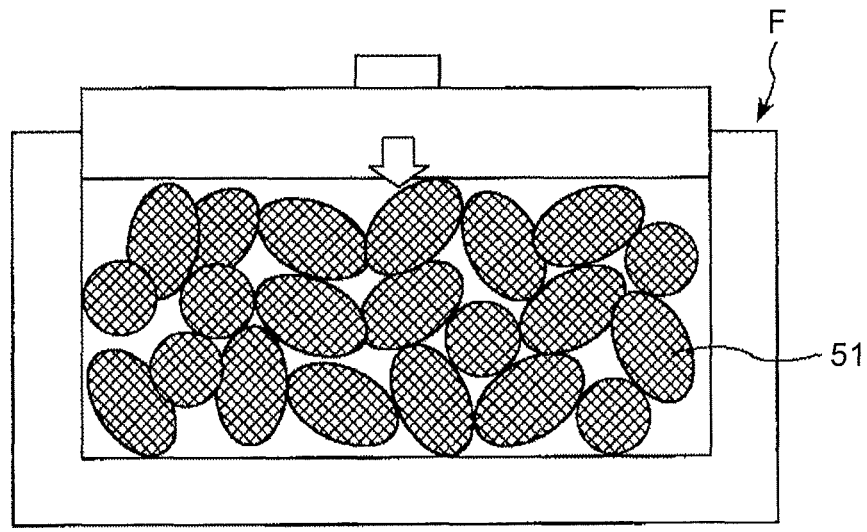
FIGS. 3A and 3B are views for illustrating a method for producing the lithium secondary battery shown in FIG. 2.
Figure 3B:
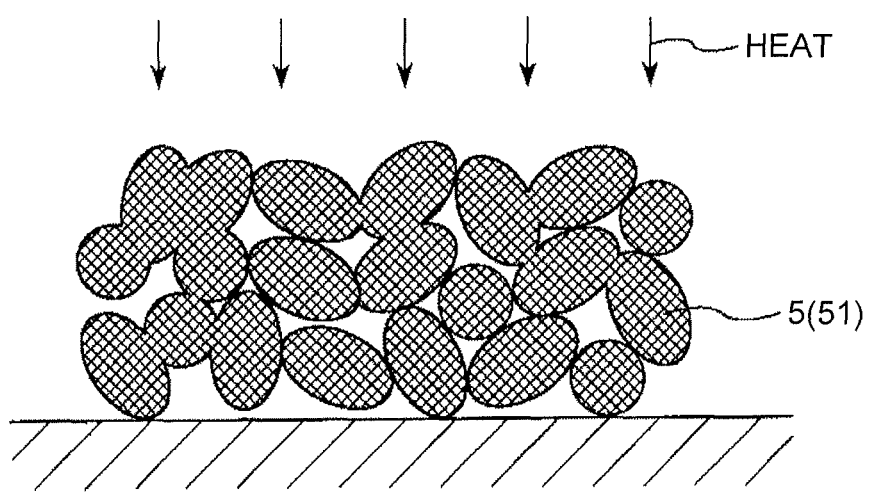

As shown in FIGS. 3A and 3B, the multiple oxide molded body 5 is formed by, for example, molding a compression-molded material by compressing the plurality of multiple oxide particles 51 using a mold F (see FIG. 3A), and thereafter, subjecting the obtained compression-molded material to a heat treatment (first heating treatment), thereby three-dimensionally connecting the plurality of multiple oxide particles 51 to one another (see FIG. 3B).

The first heating treatment is preferably performed under a temperature condition of 600° C. or higher and 900° C. or lower, more preferably performed under a temperature condition of 650° C. or higher and 850° C. or lower. According to this, the multiple oxide molded body 5 in which the multiple oxide particles 51 are integrated by sintering can be reliably obtained.

Further, the first heating treatment is preferably performed for 5 minutes or more and 36 hours or less, more preferably performed for 4 hours or more and 14 hours or less.

By performing the heat treatment as described above, grain boundary growth in the multiple oxide particles 51 and sintering between the multiple oxide particles 51 are allowed to proceed so that the retention of the shape of the obtained multiple oxide molded body 5 is facilitated, and thus, the addition amount of a binder in the multiple oxide molded body 5 can be reduced. Further, a bond is formed between the multiple oxide particles 51 by sintering, and therefore, an electron transfer pathway between the multiple oxide particles 51 can be formed.

Further, as the forming material to be used for forming the multiple oxide particles 51, an organic polymer compound such as polyvinylidene fluoride (PVdF), polyvinyl alcohol (PVA), or polypropylene carbonate (PPC) may be added as a binder. Such a binder is burned or oxidized in the heat treatment in this step, and the amount thereof is reduced.

Further, it is preferred that to the forming material to be used for forming the multiple oxide particles 51, a pore-forming material in the form of particles composed of a polymer or a carbon powder is added as a pore template when performing compact molding. By mixing such a pore-forming material, the control of the porosity of the multiple oxide molded body is facilitated. Such a pore-forming material is decomposed and removed by burning or oxidation during the heat treatment, and therefore, the amount thereof is reduced in the obtained multiple oxide molded body. The average particle diameter of such a pore-forming material is preferably from 0.5 μm to 10 μm.

Further, it is preferred that the pore-forming material includes particles (first particles) composed of a substance having a deliquescent property. When the first particles deliquesce, water generated around the first particles functions as a binder for bonding the lithium multiple oxide particles in the form of particles, and therefore, it becomes possible to maintain the shape while the multiple oxide particles in the form of particles are compression-molded and subjected to a heat treatment. Accordingly, the multiple oxide molded body can be obtained without adding an additional binder or while reducing the addition amount of a binder, and the electrode assembly having a high capacity can be easily obtained. Examples of the particles having a deliquescent property include particles composed of polyacrylic acid.

Further, it is preferred that the pore-forming material further includes particles (second particles) composed of a substance having no deliquescent property. Water is generated around the first particle, and this may cause the deviation of the porosity of the multiple oxide molded body from the desired set value in some cases. Due to this, by including the second particles along with the first particles, it becomes possible to prevent the porosity from deviating from the desired set value while maintaining the function of the first particles as a binder.

Examples of a precursor of the metal multiple oxide represented by the above general formula (1) or a derivative thereof include the following (A1), (B1), and (C1).

(A1) a composition including a salt which contains metal atoms to be contained in the metal multiple oxide represented by the above general formula (1) or a derivative thereof at a ratio according to the compositional formula thereof, and is converted to the metal multiple oxide represented by the above general formula (1) or a derivative thereof by oxidation (B1) a composition including a metal alkoxide which contains metal atoms to be contained in the metal multiple oxide represented by the above general formula (1) or a derivative thereof at a ratio according to the compositional formula thereof (C1) a dispersion liquid in which the metal multiple oxide represented by the above general formula (1) or a derivative thereof in the form of fine particles or a sol in the form of fine particles containing metal atoms to be contained in the metal multiple oxide represented by the above general formula (1) or a derivative thereof at a ratio according to the compositional formula thereof is dispersed in a solvent, or in (A1) or (B1)

The salt to be contained in (A1) includes a metal complex. Further, (B1) is a precursor when the metal multiple oxide represented by the above general formula (1) or a derivative thereof is formed using a so-called sol-gel method.

The firing of the precursor is performed, for example, in an air atmosphere. Specifically, the firing may be performed at a firing temperature in the range of 300° C. or higher and 700° C. or lower. According to this, the metal multiple oxide represented by the above general formula (1) or a derivative thereof is produced from the precursor by the firing.

By performing the firing at a temperature in such a range, the crystallinity of the metal multiple oxide represented by the above general formula (1) or a derivative thereof is improved, and thus, the electron conductivity of the multiple oxide can be improved.

Figure 4A:
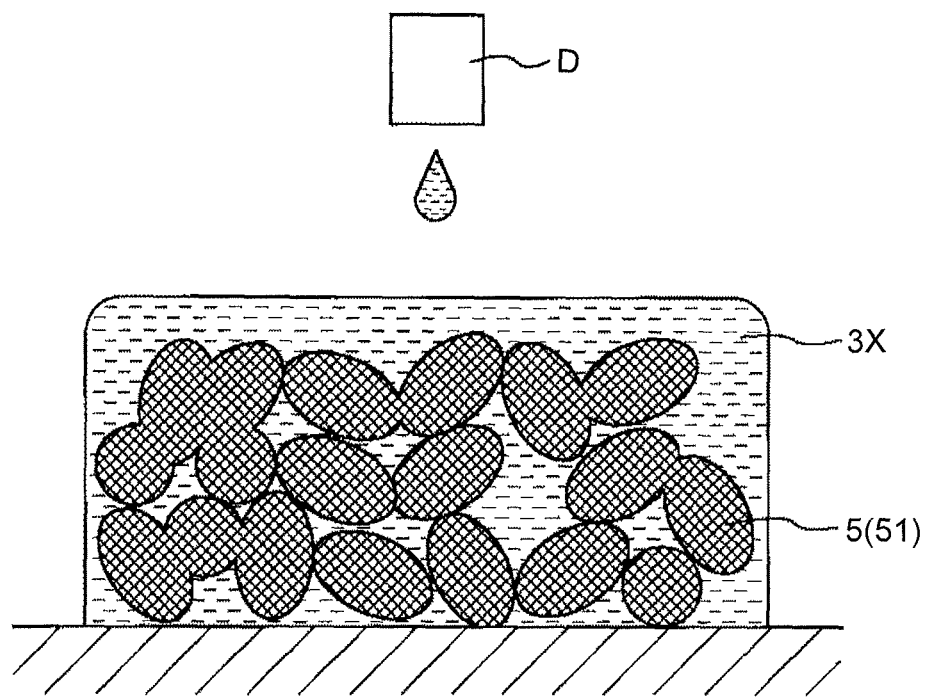
FIGS. 4A and 4B are views for illustrating a method for producing the lithium secondary battery shown in FIG. 2.
Figure 4B:
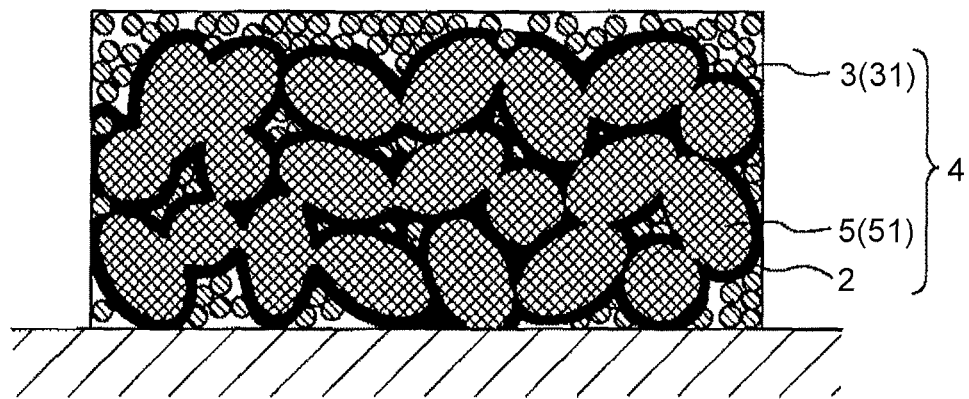

As shown in FIGS. 4A and 4B, a liquid 3X containing a precursor of the solid electrolyte is applied onto the surface of the multiple oxide molded body 5 including the inside of the communication holes of the multiple oxide molded body 5 (FIG. 4A), followed by firing (heating) to convert the precursor to the inorganic solid electrolyte, thereby forming a solid electrolyte layer 3 composed of a particulate body 31 and an active material layer 2 which covers the surface of a multiple oxide particle 51 between the solid electrolyte layer 3 and the multiple oxide molded body 5 (FIG. 4B, second step).

By doing this, on the surface of the multiple oxide particle 51 exposed in the gap (communication hole) of the multiple oxide molded body 5, the active material layer 2 and the solid electrolyte layer 3 are formed in a state of being stacked in this order, and as a result, a composite body 4 including the active material layer 2, the solid electrolyte layer 3, and the multiple oxide molded body 5 is formed.

The liquid 3X may contain a solvent which can dissolve the precursor in addition to the precursor. In the case where the liquid 3X contains a solvent, after applying the liquid 3X, the solvent may be appropriately removed before firing. In the removal of the solvent, one method or two or more methods in combination selected from generally known methods such as heating, pressure reduction, and air-blowing can be adopted.

Since the solid electrolyte layer 3 composed of the particulate body 31 and the active material layer 2 are formed by applying the liquid 3X having fluidity, the solid electrolyte and the active material can be favorably formed also on the inner surface of each pore of the fine multiple oxide molded body 5. Due to this, the contact area between the active material layer 2 and the solid electrolyte layer 3 is easily increased so that the current density at the interface between the active material layer 2 and the solid electrolyte layer 3 is decreased, and as a result, a high output power can be easily obtained.

The liquid 3X can be applied by any of various methods as long as the method can allow the liquid 3X to penetrate into the inside of the pores of the multiple oxide molded body 5. For example, a method in which the liquid 3X is added dropwise to a place where the multiple oxide molded body 5 is placed, a method in which the multiple oxide molded body 5 is immersed in a place where the liquid 3X is pooled, or a method in which an edge portion of the multiple oxide molded body 5 is brought into contact with a place where the liquid 3X is pooled so that the inside of each pore is impregnated with the liquid 3X by utilizing a capillary phenomenon may be adopted. In FIG. 4A, a method in which the liquid 3X is added dropwise using a dispenser ID is shown among the above methods.

Examples of a precursor of the solid electrolyte include the following (A2), (B2), and (C2).

(A2) a composition including a salt which contains metal atoms to be contained in the inorganic solid electrolyte at a ratio according to the compositional formula of the inorganic solid electrolyte, and is converted to the inorganic solid electrolyte by oxidation (B2) a composition including a metal alkoxide which contains metal atoms to be contained in the inorganic solid electrolyte at a ratio according to the compositional formula of the inorganic solid electrolyte (C2) a dispersion liquid in which the inorganic solid electrolyte in the form of fine particles or a sol in the form of fine particles containing metal atoms to be contained in the inorganic solid electrolyte at a ratio according to the compositional formula of the inorganic solid electrolyte is dispersed in a solvent, or in (A2) or (B2)

The salt to be contained in (A2) includes a metal complex. Further, (B2) is a precursor when the inorganic solid electrolyte is formed using a so-called sol-gel method.

The firing of the precursor is performed, for example, in an air atmosphere. Specifically, the firing may be performed at a firing temperature in the range of 300° C. or higher and 700° C. or lower. According to this, the inorganic solid electrolyte is produced from the precursor by the firing, whereby the solid electrolyte layer 3 is formed.

By performing firing in this manner, a solid-phase reaction by mutual diffusion of elements constituting the respective members occurs at the interface between the surface of the multiple oxide particle 51 and the precursor of the solid electrolyte so that La contained in the multiple oxide particle 51 is extracted, whereby the active material layer 2 is formed on the surface of the multiple oxide particle 51. Then, a particulate body 31 is produced from the precursor of the solid electrolyte, whereby the solid electrolyte layer 3 composed of this particulate body 31 is formed on the active material layer 2.

From the viewpoint that La contained in the multiple oxide particle 51 is extracted from the multiple oxide particle 51, it is preferred that the precursor of the solid electrolyte is made to contain Ln, and this Ln in the precursor of the solid electrolyte is the same as the Ln contained in the multiple oxide particle 51. According to this, when the solid electrolyte layer 3 is formed using the precursor of the solid electrolyte, La contained in the multiple oxide particle 51 can be reliably extracted, and thus, the active material layer 2 can be reliably formed between the multiple oxide particle 51 and the solid electrolyte layer 3, and also the active material layer 2 and the solid electrolyte layer 3 can be made to have excellent adhesiveness to the multiple oxide molded body 5. Examples of the constituent material of such a solid electrolyte layer 3 include $Li_7La_3Zr_2O_{12}$ and $Li_{6.75}La_3Zr_{1.75}Nb_{0.25}O_{12}$.

The firing may be performed by performing the heat treatment once, or may be performed by dividing the heat treatment into a first heat treatment in which the precursor is adhered to the surface of the porous body and a second heat treatment in which heating is performed under a temperature condition of not lower than the treatment temperature in the first heat treatment and 700° C. or lower. By performing the firing by such a stepwise heat treatment, the solid electrolyte layer 3 can be easily formed at a desired position.

Subsequently, by grinding and polishing the face 41 of the composite body 4, both of the solid electrolyte layer 3 and the multiple oxide molded body 5 are exposed from the face 41 (see FIG. 5A).

Figure 5A:
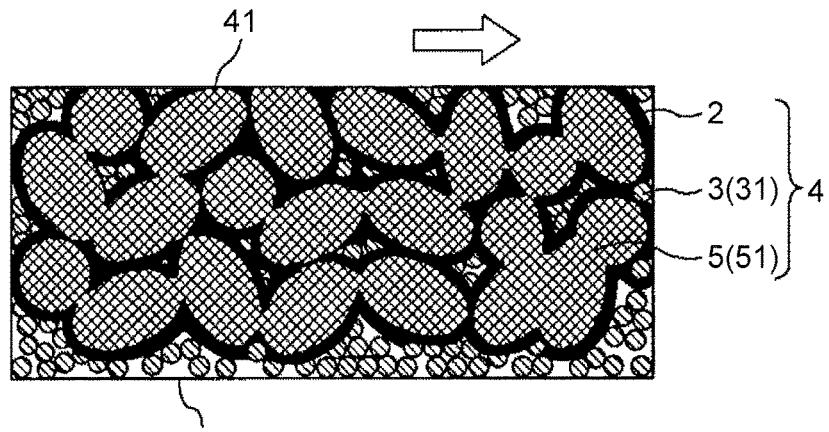
FIGS. 5A to 5C are views for illustrating a method for producing the lithium secondary battery shown in FIG. 2.

At this time, as shown in FIG. 5A, it is preferred that also the active material layer 2 is exposed.

Further, in this case, on the face 41, a scratch mark (a grinding and polishing mark), which is a mark of the grinding and polishing process is left.

Incidentally, when the composite body 4 is formed, both of the active material layer 2 and the multiple oxide molded body 5 are exposed from the face 41 in some cases. In such a case, grinding and polishing of the face 41 of the composite body 4 can be omitted.

Figure 5B:
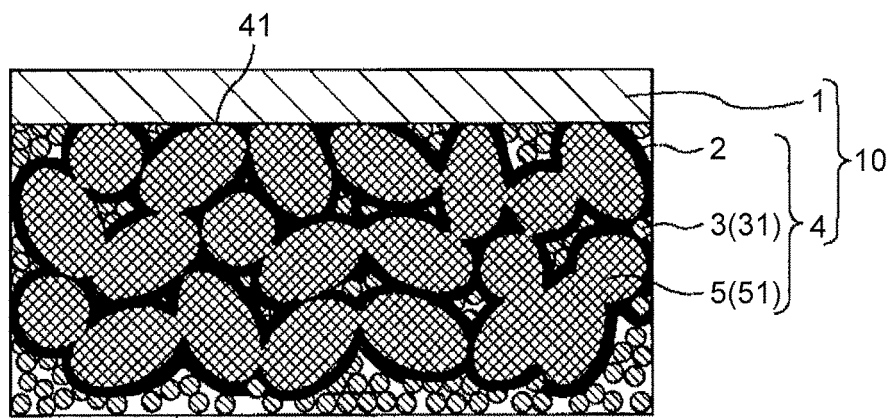

Subsequently, as shown in FIG. 5B, a current collector 1 is formed on the face 41 of the composite body 4 (third step).

By doing this, an electrode assembly (the electrode assembly according to the invention) 10 including the active material layer 2, the solid electrolyte layer 3, the multiple oxide molded body 5, and the current collector 1 is formed.

The bonding of the current collector 1 may be performed by bonding a current collector formed as a separate body to the face 41 of the composite body 4, or by forming the current collector 1 described above on the face 41 of the composite body 4 by deposition.

As the deposition method for the current collector 1, various physical vapor phase deposition (PVD) methods and chemical vapor phase deposition (CVD) methods can be used.

By the above-mentioned production method, the electrode assembly 10 can be formed.

Figure 5C:
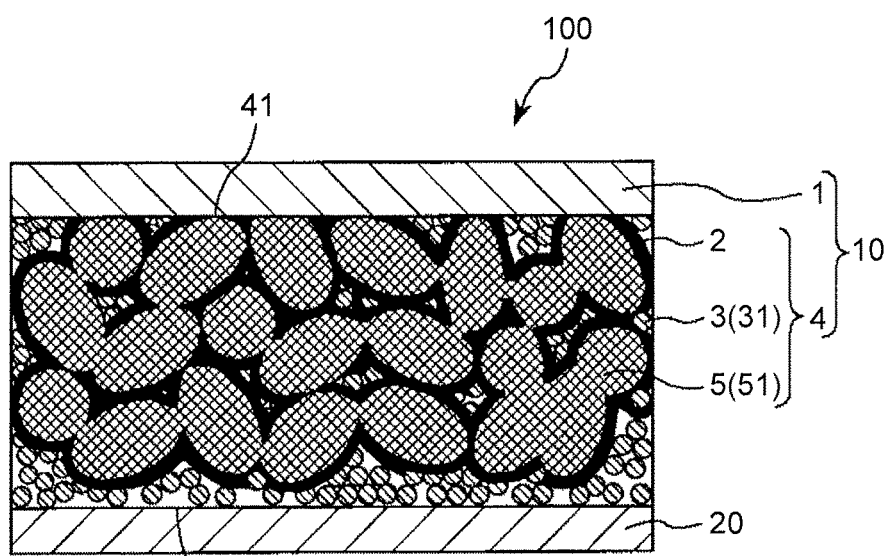

Subsequently, as shown in FIG. 5C, an electrode 20 is bonded to the other face 42 of the composite body 4. The bonding of the electrode 20 may be performed by bonding an electrode formed as a separate body to the other face 42 of the composite body 4, or by deposing the forming material of the electrode 20 described above on the other face 42 of the composite body 4.

As the deposition method for the electrode 20, the same method as described in the deposition method for the current collector 1 can be used.

In this manner, the lithium secondary battery 100 is produced.

The multiple oxide molded body 5 may also be obtained by a method in which a slurry containing the multiple oxide particles 51 dispersed in a solvent is heated other than the method in which the multiple oxide particles 51 are compression-molded and thereafter heated as described above.

The method includes a preparation step of preparing a slurry containing the multiple oxide particles 51 and a drying step of obtaining the multiple oxide molded body 5 by heating the slurry.

Next, these steps will be described.

First, a binder is dissolved in a solvent, and the multiple oxide particles 51 are dispersed therein, whereby a slurry 26 is prepared. In the slurry 26, a dispersant such as oleylamine may be contained.

Figure 6:
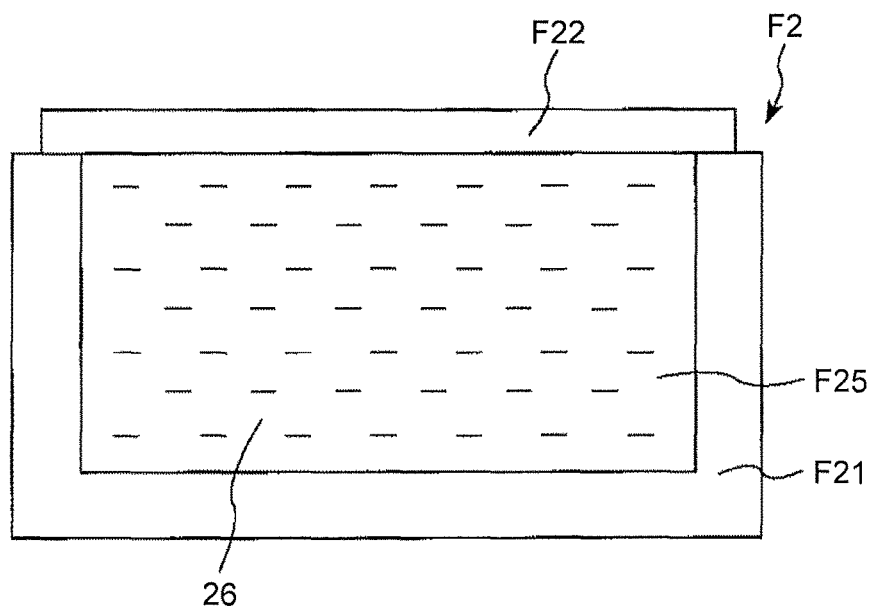
FIG. 6 is a view for illustrating a method for producing the lithium secondary battery shown in FIG. 2.

Subsequently, a mold F2 having a bottom portion F21 including a concave portion F25 and a lid portion F22 is prepared, and the slurry 26 is added dropwise into the concave portion F25 of the bottom portion F21, and thereafter, the bottom portion F21 is covered with the lid portion F22 (see FIG. 6).

The content of the multiple oxide particles 51 in the slurry 26 is preferably 10 wt % or more and 60 wt % or less, more preferably 30 wt % or more and 50 wt % or less. According to this, the multiple oxide molded body 5 in which the filling factor of the solid electrolyte is high is obtained.

The binder is not particularly limited, however, examples thereof include other than a polycarbonate such as polypropylene carbonate (PPC), a cellulose-based binder, an acrylic binder, a polyvinyl alcohol-based binder, and a polyvinyl butyral-based binder, and among these, one type or two or more types in combination can be used.

The solvent is not particularly limited, but is preferably, for example, an aprotic solvent. According to this, the deterioration of the multiple oxide particles 51 due to the contact with the solvent can be reduced.

Specific examples of such an aprotic solvent include butanol, ethanol, propanol, methyl isobutyl ketone, 1,4-dioxane, toluene, and xylene, and a single solvent or a mixed solvent thereof can be used as the solvent.

Subsequently, by heating the slurry 26 containing the multiple oxide particles 51, the slurry 26 is dried, and also the multiple oxide particles 51 contained in the slurry 26 are sintered with each other, whereby the multiple oxide molded body 5 is obtained.

As a method for heating the slurry 26 containing the multiple oxide particles 51 is not particularly limited, however, examples thereof include a method in which the slurry 26 is heated by spray drying using a spray dryer or the like.

The heating condition when heating the slurry 26 is set in the same manner as the condition when performing the heat treatment of the compression-molded material described above.

Further, the heating of the slurry 26 is preferably performed by a multistage heat treatment in which the temperature condition is increased stepwise. Specifically, it is preferred that after the slurry is dried at room temperature, the temperature is increased from room temperature to 300° C. over 2 hours, then further increased to 350° C. over 0.5 hours, and then further increased to 1000° C. over 2 hours, and thereafter, the concave portion F25 is covered with the lid portion F22 and firing is performed at 1000° C. for 8 hours. By increasing the temperature under such a condition, the binder contained in the solvent can be reliably burned off.

Also by undergoing the steps as described above, the multiple oxide molded body 5 can be obtained.

Second Embodiment

In this embodiment, an electrode assembly different from that described in the first embodiment is described. Incidentally, in the following embodiments including this embodiment or Examples, the same reference numerals are given to the same constituent components as in the first embodiment, and the description thereof is sometimes omitted.

Figure 7:
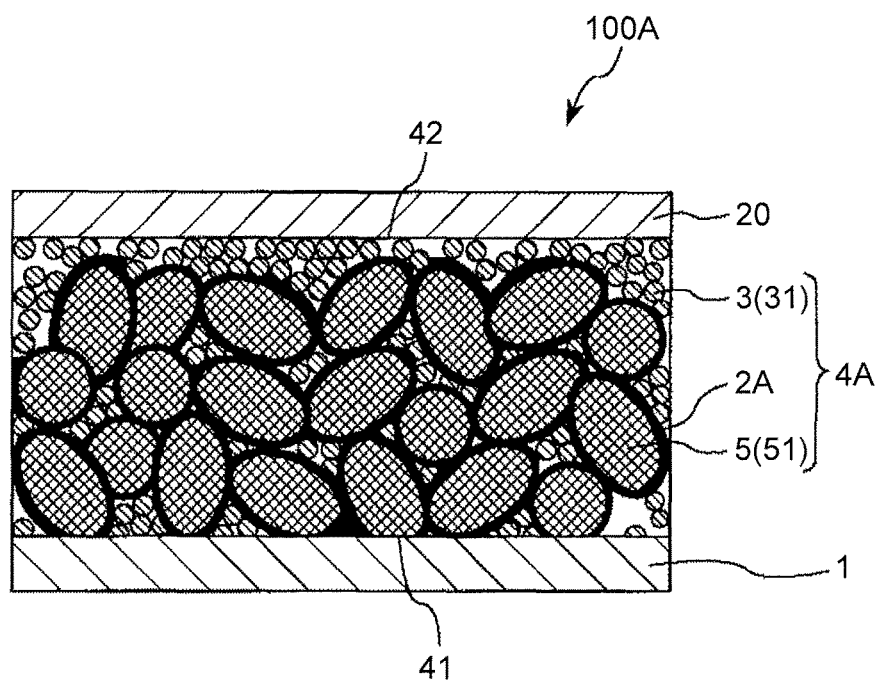
FIG. 7 is a longitudinal cross-sectional view showing a second embodiment in which a battery according to the invention is applied to a lithium secondary battery.

FIG. 7 shows a longitudinal cross-sectional view of an electrode assembly 10 according to this embodiment.

The electrode assembly 10 includes an active material layer 2A which is of a different type from the active material layer 2 in the first embodiment.

The active material layer 2A is formed so as to cover substantially the entire surface of a multiple oxide particle 51, and a multiple oxide molded body 5 is formed by connecting a plurality of multiple oxide particles 51 to one another in a state where substantially the entire surface of each multiple oxide particle 51 is covered with the active material layer 2A.

Therefore, although in the multiple oxide molded body 5 in the first embodiment, the multiple oxide particles 51 are directly connected to one another, however, in the multiple oxide molded body 5 in this embodiment, the multiple oxide particles 51 are connected to one another through the active material layer 2A. The electrode assembly 10 in this embodiment has the same configuration as the electrode assembly 10 in the first embodiment with respect to the other parts.

In this embodiment, in the inside of the communication hole of the multiple oxide molded body 5 and around the multiple oxide molded body 5, a solid electrolyte layer 3 is formed through the active material layer 2A. On one face 41 of a composite body 4A including the active material layer 2A, a current collector 1 is formed. Then, as shown in FIG. 7, by forming an electrode 20 on the other face 42 of the composite body 4A, a lithium secondary battery 100A is formed.

Third Embodiment

Figure 8:
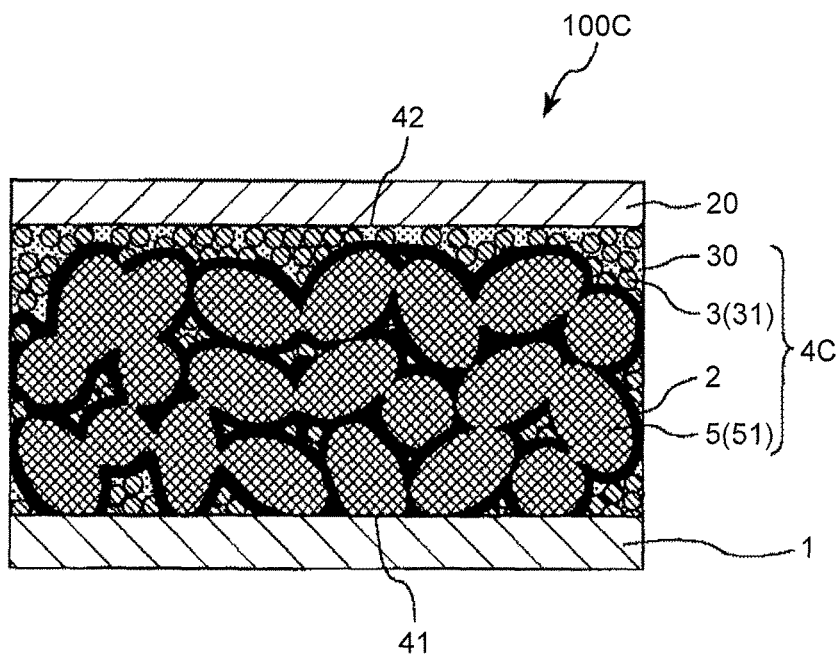
FIG. 8 is a longitudinal cross-sectional view showing a third embodiment in which a battery according to the invention is applied to a lithium secondary battery.

FIG. 8 is a view showing a longitudinal cross-sectional view of a lithium secondary battery 100C to which an electrode assembly 10 according to this embodiment is applied.

The electrode assembly 10 includes a composite body 4C which includes an active material layer 2, a solid electrolyte layer 3, a filling layer 30, and a multiple oxide molded body 5, and a current collector 1. The composite body 4C includes the same constituent components as the composite body 4 except that the composite body 4C includes the filling layer 30.

The filling layer (second solid electrolyte layer) conducts a lithium ion, and is composed of a solid electrolyte which is non-crystalline (vitreous or amorphous) at room temperature. The filling layer 30 is composed of, for example, lithium oxide containing C, Si, or B having lithium ion conductivity. Specifically, the filling layer 30 may contain at least one or more compounds selected from $Li_2CO_3$, $Li_4SiO_4$, $Li_{2+x}C_{1-x}B_xO_3$ ($0.1<x<0.4$), and $Li_3BO_3$.

The filling layer 30 is used for reducing the volume of a gap in the case where the gap is formed only with the solid electrolyte layer 3. Therefore, it is preferred that the shrinkage of the volume of a precursor of the filling layer 30 by heating is smaller than the shrinkage of the volume of a precursor of the solid electrolyte layer 3 by heating.

According to this, the filling layer 30 can be formed using a method in which after the solid electrolyte layer 3 is formed, a precursor solution of the filling layer 30 having fluidity, that is, a precursor solution of the solid electrolyte which is non-crystalline at room temperature is impregnated into the remaining gaps, followed by heating.

Further, it is preferred that the filling layer 30 can be formed at a temperature equal to or lower than the temperature at which the solid electrolyte layer 3 is formed. This is to suppress the mutual diffusion between the solid electrolyte layer 3 and the filling layer 30. For example, a case where $Li_7La_3Zr_2O_{12}$ is used as the solid electrolyte layer 3 and $Li_3BO_3$ is used as the filling layer 30 is considered. In this case, the firing temperature when the solid electrolyte layer 3 is formed is about 700° C., however, if the forming temperature when the filling layer 30 is formed exceeds 900° C., mutual diffusion may occur between the solid electrolyte layer 3 and the filling layer 30. Further, as the precursor of the filling layer 30, any of (A2) to (C2) may be used in the same manner as the precursor of the solid electrolyte layer 3. The precursor is diluted with a solvent (for example, an alcohol-based compound), whereby a precursor solution is obtained. This precursor solution is impregnated into the remaining gaps. A method for impregnating the precursor solution is the same as the method described for the solid electrolyte layer 3.

Further, the heating temperature at which the precursor solution filled in the gaps is heated is set to, for example, 300° C. or higher and 450° C. or lower.

By using the electrode assembly 10 including the composite body 4C, the characteristics of the lithium secondary battery 100C can be improved.

Fourth Embodiment

Figure 9:
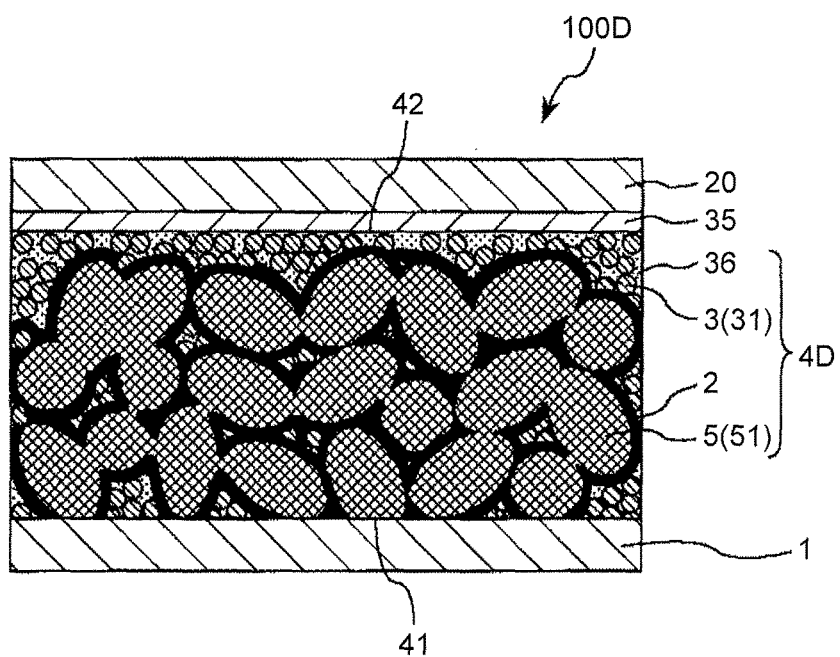
FIG. 9 is a longitudinal cross-sectional view showing a fourth embodiment in which a battery according to the invention is applied to a lithium secondary battery.

FIG. 9 shows a longitudinal cross-sectional view of a lithium secondary battery 100D according to this embodiment. The lithium secondary battery 100D includes an electrode assembly including a composite body 4D, an electrode 20, and an electrolyte solution impregnated layer 35 between the composite body 4D and the electrode 20.

The composite body 4D is obtained by impregnating an electrolyte solution 36 into a gap present after forming a solid electrolyte layer 3. According to this, in a portion where a multiple oxide molded body 5 is not in contact with the solid electrolyte layer 3, the electrolyte solution 36 comes in contact with the multiple oxide molded body 5.

In the lithium secondary battery 100D, the composite body 4D includes the multiple oxide molded body 5 which is constituted by a porous body including a gap, an active material layer 2 which covers the surface of a multiple oxide particle 51 exposed in the gap of the multiple oxide molded body 5, the solid electrolyte layer 3 which is provided on the surface of the multiple oxide molded body 5 including the inside of the gap of the multiple oxide molded body 5 through the active material layer 2, the electrolyte solution 36 which is filled in the gap remaining due to the formation of the solid electrolyte layer 3 and the active material layer 2, and the electrolyte solution impregnated layer 35 which is provided between the solid electrolyte layer 3 and the electrode 20 and is bonded to these members. In other words, the composite body 4D is different from the composite body 4 of the first embodiment in that it further includes the electrolyte solution 36 which is provided so as to fill the gap remaining in the composite body 4D and the electrolyte solution impregnated layer 35 which is provided between the composite body 4D and the electrode 20.

In this composite body 4D, the electrolyte solution impregnated layer 35 is provided between the composite body 4D and the electrode 20, and the gap remaining therein is filled with the electrolyte solution 36 by supplying the electrolyte solution 36 to the gap from the electrolyte solution impregnated layer 35. According to this, the decrease in the ion conductivity between the active material layer 2 and the solid electrolyte layer 3 due to the increase in the resistance between the active material layer 2 and the solid electrolyte layer 3 resulted from the decrease in the contact area between the active material layer 2 and the solid electrolyte layer 3 in the gap can be reliably prevented.

In general, when charge-discharge cycles are repeated in a lithium secondary battery, the volume of the active material layer 2 or the solid electrolyte layer 3 changes in some cases. On the other hand, according to this embodiment, for example, even if the volume shrinks and the gap expands, the electrolyte solution further comes out from the electrolyte solution impregnated layer 35 to fill the gap with the electrolyte solution 36. On the other hand, even if the volume expands and the gap shrinks, the electrolyte solution 36 in the gap is soaked in the electrolyte solution impregnated layer 35. In this manner, the gap of the composite body 411) serves as a buffer space which absorbs the volume change, and thus, the charge conduction path is ensured. That is, a lithium secondary battery having a high output power can be obtained.

Incidentally, the electrolyte solution 36 (the ionic liquid in the electrolyte solution impregnated layer) is in a small amount and is also nonvolatile, and therefore, a problem of leakage or burning does not occur.

The electrolyte solution impregnated layer 35 is a film which functions as a supply source of a polymer gel electrolyte. This electrolyte solution impregnated layer 35 is a film impregnated with an electrolyte solution which conducts a lithium ion. That is, the electrolyte solution impregnated layer 35 includes a support and a polymer gel electrolyte (electrolyte solution).

The support is a member for physically supporting the structure of the electrolyte solution impregnated layer (PEG film) 35. The support is preferably a member which does not deposit impurities, does not react with the other materials such as the polymer gel electrolyte, and has high wettability to an ionic liquid+a Li salt+a monomer. If the member deposits impurities or causes a chemical reaction, the characteristics may change. Further, if the wettability is poor, a polymer may not be able to be uniformly formed on the support. Incidentally, the strength can also be improved by increasing the ratio of a polymer component in the polymer gel electrolyte without using the support, however, when the ratio of the polymer component is increased, the lithium conductivity is decreased, and therefore, it is preferred to use the support. As the support, for example, long-fiber cellulose or hydrophobic PVDF (polyvinylidene fluoride) is used.

The polymer gel electrolyte is required to be chemically stable against Li and have a characteristic capable of being gelled to hold the electrolyte solution. A common PEG (polyethylene glycol)-based film is chemically stable against Li and a battery operation can be confirmed. However, the PEG film has low ion conductivity, and a practical output power as a battery cannot be obtained. Therefore, in this embodiment, a polymer gel electrolyte which does not volatilize the electrolyte solution is used.

Such a composite body 4D can be formed by, for example, using a method in which the electrolyte solution impregnated layer 35 is bonded to one face of the composite body having a gap remaining therein and including the active material layer 2, the solid electrolyte layer 3, and the multiple oxide molded body 5, thereby supplying the electrolyte solution to the gap from the electrolyte solution impregnated layer 35.

The electrolyte solution impregnated layer 35 is produced by, for example, impregnating the support (substrate) with, the electrolyte solution and a precursor solution containing a monomer, followed by photopolymerization. The electrolyte solution contains an ionic liquid and a lithium salt. As the ionic liquid, for example, P13-TFSI (N-methyl-N-propylpyrrolidinium bis(trifluoromethanesulfonyl)imide) is used. As the lithium salt, Li-TFSI (lithium N,N-bis(trifluoromethanesulfonyl)imide) is used. As the monomer, for example, polyethylene glycol diacrylate (TEGDA) is used. By mixing a polymerization initiator and ethylene carbonate in the above electrolyte solution, a PEG-producing solution is obtained. As the polymerization initiator, for example, a radical photopolymerization initiator (for example, IRGACURE 651, 2,2-dimethoxy-1,2-diphenylethan-1-one, manufactured by BASF Corporation) is used. The polymerization initiator is mixed at, for example, a mixing ratio of 6:1 on a weight basis. Ethylene carbonate is used as an SEI (Solid Electrolyte Interface) forming material. The SEI is a coating film for inactivating and stabilizing the surface of an Li electrode. The SEI is produced by the reductive decomposition reaction of the electrolyte solution, and it has been confirmed that a charge is consumed by the decomposition reaction of ethylene carbonate in the first cycle. Ethylene carbonate is mixed at a mixing ratio of 1. This PEG-producing solution is impregnated into the support. As the support, for example, a hydrophobic PVDF membrane filter manufactured by Millipore Corporation is used. The support impregnated with the PEG-producing solution is irradiated with light in a predetermined wavelength range (for example, UV light) to form a polymer by photopolymerizing the monomer, whereby the electrolyte solution impregnated layer 35 is obtained. The electrolyte solution contained in the electrolyte solution impregnated layer 35 is filled in the remaining gap and functions as the electrolyte solution 36.

The electrolyte solution contained in the electrolyte solution impregnated layer 35 has favorable wettability to an oxide solid electrolyte, and therefore goes along the solid electrolyte layer 3 and penetrates into the remaining gap, and thus, the electrolyte solution 36 is filled in the gap. According to this, the bonding between the active material and the electrolyte becomes more favorable, and therefore, the lithium secondary battery 100D having further improved characteristics can be obtained.

Hereinabove, the electrode assembly and the lithium secondary battery according to the invention have been described. However, the invention is not limited thereto. The invention can be widely applied without departing from the scope of the gist of the invention.

For example, the configuration of each part of the electrode assembly and the battery according to the invention may be replaced with an arbitrary configuration having a similar function. Further, another arbitrary component may be added to the invention. In addition, the invention may be configured to combine arbitrary two or more configurations (features) of the above-mentioned respective embodiments.

In addition, the battery according to the invention can also be applied to a lithium primary battery other than the lithium secondary battery described in the above-mentioned respective embodiments. Further, the battery according to the invention can also be applied to a sodium ion battery, a magnesium battery, and the like.

EXAMPLES

Next, specific examples of the invention will be described.

1. Production of Composite Body

Example 1

<1> First, $La_2O_3$, $Li_2CO_3$, and $Co_3O_4$ were suspended in isopropyl alcohol and mixed by grinding using an automatic agate mortar. The resulting mixture was fired at 800° C. in an air atmosphere. The resulting aggregate after the firing was ground using the agate mortar, whereby a $La_2Li_{0.5}Co_{0.5}O_4$ powder (multiple oxide particles) was obtained. Subsequently, to the $La_2Li_{0.5}Co_{0.5}O_4$ powder, 5 parts by weight of polypropylene carbonate (manufactured by Sigma-Aldrich Japan Co., Ltd.) was added and mixed using the agate mortar. The resulting mixture was filled in a pellet die provided with an exhaust port having an inner diameter of 10 mm, and uniaxially pressed at a pressure of 624 MPa, and then released from the die, whereby a press-molded body was obtained. This press-molded body was sintered at 800° C. in an air atmosphere, whereby a porous sintered body (multiple oxide molded body) composed of $La_2Li_{0.5}Co_{0.5}O_4$ and having a bulk density of 63% was obtained.

<2> Subsequently, into the obtained porous sintered body, a solution in which $LiNO_3$, $Zr(O_4H_9)_4$ and $Nb(OC_2H_5)_5$ were dissolved in 2-butoxyethanol was allowed to penetrate. Then, the sintered body was dried and thereafter fired at 800° C. in an air atmosphere.

By doing this, a solid-phase reaction such as extraction of La occurred between the solid electrolyte precursor deposited on the inner wall of the pore of the porous sintered body and $La_2Li_{0.5}Co_{0.5}O_4$, and as a result, a composite body of Example 1 in which $La_2Li_{0.5}Co_{0.5}O_4$ was included as a core material (multiple oxide molded body), and a layer containing $LiCoO_2$ as the active material layer and a layer containing $Li_{6.75}La_3Zr_{1.75}Nb_{0.25}O_{12}$ as the solid electrolyte layer were stacked in this order on the surface of the core material was obtained.

Comparative Example

A composite body of Comparative Example in which the formation of the active material layer was omitted was obtained in the same manner as in the above Example 1 except that in the above step <2>, a solution in which $La(NO_3)_3 \cdot 6H_2O$ was further added was used as the precursor.

2. Evaluation of Composite Body

With respect to each of the composite bodies of Example 1 and Comparative Example, the charge-discharge characteristics were evaluated as follows.

That is, the charge-discharge characteristics were measured using a multi-channel charge-discharge evaluation apparatus (HJ1001SD8, manufactured by Hokuto Denko Corporation). The measurement was performed under driving conditions of a constant current-constant voltage at a current density of 0.1 mA/cm$^2$ and an upper limit charge voltage of 4.2 V, and a constant current at a lower limit discharge voltage of 3.0 V.

Further, for each of the composite bodies of Example 1 and Comparative Example, aluminum as a positive electrode, and lithium and copper as a negative electrode were used. As for the positive electrode, an aluminum plate was attached to a polished surface, whereby the electrode was formed. As for the negative electrode, first, an electrolyte layer was formed. The electrolyte layer was formed by applying a liquid composition composed of polymethyl methacrylate (PMMA) (manufactured by Soken Chemical & Engineering Co., Ltd.), LiTFSI (manufactured by Kishida Chemical Co., Ltd.), ethylene carbonate (manufactured by Sigma-Aldrich Co., Ltd.), and dimethyl carbonate (manufactured by Sigma-Aldrich Co., Ltd.), followed by drying and solidification. Further, a lithium metal foil and a copper foil were stacked in this order from the electrolyte layer, and then press-bonded to each other, whereby the negative electrode was formed. With respect to the thus obtained lithium secondary batteries, the charge-discharge characteristics were evaluated.

As a result, the lithium secondary battery using the composite body of Example 1 showed favorable charge-discharge characteristics as compared with the lithium secondary battery using the composite body of Comparative Example. That is, the result that by forming the active material layer between the multiple oxide molded body and the solid electrolyte layer, the charge-discharge characteristics are improved was obtained.

What is claimed is:
1. An electrode assembly, comprising:
a composite body which includes an active material portion, a solid electrolyte portion, and a multiple oxide portion; and
a current collector which is bonded to the composite body, wherein
the active material portion contains an active material constituted by a transition metal oxide,
the solid electrolyte portion contains a solid electrolyte having ion conductivity,
the multiple oxide portion contains at least one of a metal multiple oxide represented by the following formula (1) and a derivative thereof, and
in the composite body, the active material portion is formed between and in contact with the multiple oxide portion and the solid electrolyte portion:

$$Ln_2Li_{0.5}M_{0.5}O_4 \qquad (1)$$

wherein Ln represents a lanthanoid, and M represents a transition metal.

2. The electrode assembly according to claim 1, wherein the active material portion is formed in the form of a layer so as to cover the multiple oxide portion.

3. The electrode assembly according to claim 1, wherein
the multiple oxide portion includes a plurality of communication holes therein, and
the active material portion covers the surfaces of the plurality of communication holes.

4. The electrode assembly according to claim 1, wherein the surface of a face of the composite body to which another electrode for constituting a battery is bonded is the solid electrolyte portion.

5. The electrode assembly according to claim 1, wherein the electron conductivity of the multiple oxide portion is higher than the electron conductivity of the active material portion.

6. The electrode assembly according to claim 1, wherein the transition metal oxide contains lithium and at least one element selected from cobalt, manganese, and nickel.

7. The electrode assembly according to claim 1, wherein the solid electrolyte has a garnet-type crystal structure or a quasi-garnet-type crystal structure.

8. A battery, comprising:
the electrode assembly according to claim 1, and
an electrode provided on a face of the composite body to which another electrode is bonded.

9. A battery, comprising:
the electrode assembly according to claim 2, and
an electrode provided on a face of the composite body to which another electrode is bonded.

10. A battery, comprising:
the electrode assembly according to claim 3, and
an electrode provided on a face of the composite body to which another electrode is bonded.

11. A battery, comprising:
the electrode assembly according to claim 4, and
an electrode provided on a face of the composite body to which another electrode is bonded.

12. A battery, comprising:
the electrode assembly according to claim 5, and
an electrode provided on a face of the composite body to which another electrode is bonded.

13. A battery, comprising:
the electrode assembly according to claim 6, and
an electrode provided on a face of the composite body to which another electrode is bonded.

14. A battery, comprising:
the electrode assembly according to claim 7, and
an electrode provided on a face of the composite body to which another electrode is bonded.

* * * * *